(12) United States Patent
Ma

(10) Patent No.: US 12,180,040 B2
(45) Date of Patent: Dec. 31, 2024

(54) BELT WITH LAYERED LOAD BEARING ELEMENTS

(71) Applicant: Otis Elevator Company, Farmington, CT (US)

(72) Inventor: Jun Ma, Farmington, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 49 days.

(21) Appl. No.: 18/157,115

(22) Filed: Jan. 20, 2023

(65) Prior Publication Data

US 2023/0159303 A1 May 25, 2023

Related U.S. Application Data

(63) Continuation of application No. 16/055,596, filed on Aug. 6, 2018, now Pat. No. 11,591,186.

(51) Int. Cl.
*B66B 7/06* (2006.01)
*D07B 1/02* (2006.01)
*D07B 1/04* (2006.01)
*D07B 1/16* (2006.01)
*D07B 1/22* (2006.01)
(Continued)

(52) U.S. Cl.
CPC .............. *B66B 7/062* (2013.01); *D07B 1/025* (2013.01); *D07B 1/04* (2013.01); *D07B 1/162* (2013.01); *F16G 1/10* (2013.01); *F16G 1/12* (2013.01); *D07B 1/22* (2013.01); *D07B 2201/2033* (2013.01); *D07B 2201/2087* (2013.01); *D07B 2205/205* (2013.01); *D07B 2205/3003* (2013.01); *D07B 2205/3007* (2013.01);
(Continued)

(58) Field of Classification Search
CPC .. B66B 7/062; D07B 1/22; D07B 2201/2033; D07B 2201/2087; D07B 2205/3025; D07B 2501/2007; D07B 1/025; D07B 1/04; D07B 1/162
See application file for complete search history.

(56) References Cited

U.S. PATENT DOCUMENTS 8,656,696 B2 2/2014 Bruch et al.
8,673,433 B2 3/2014 Reif et al.
(Continued)

FOREIGN PATENT DOCUMENTS

CN 104452373 A 3/2015
CN 104528498 A 4/2015
(Continued)

OTHER PUBLICATIONS

Chinese Office Action for Chinese Application No. 201910717265.6; dated Sep. 14, 2020, 46 pages.
(Continued)

*Primary Examiner* — Patrick J. Lynch
(74) *Attorney, Agent, or Firm* — CANTOR COLBURN LLP

(57) ABSTRACT

A load bearing tension member for an elevator system includes a plurality of tension elements arrayed across a tension member width. The tension elements are offset from a tension member central axis, the central axis bisecting a tension member thickness and extending across the tension member width. The tension elements include a plurality of fibers extending along a length of the tension element, and a matrix material in which the plurality of fibers are embedded. A jacket at least partially encapsulates the plurality of tension elements.

12 Claims, 3 Drawing Sheets

(51) Int. Cl.
*F16G 1/10* (2006.01)
*F16G 1/12* (2006.01)

(52) U.S. Cl.
CPC ............... *D07B 2205/3025* (2013.01); *D07B 2501/2007* (2013.01)

(56) References Cited

U.S. PATENT DOCUMENTS

| | | |
|---|---|---|
| 9,212,029 B2 | 12/2015 | Aulanko et al. |
| 9,550,653 B2 | 1/2017 | Wesson et al. |
| 9,944,493 B2 | 4/2018 | Dudde et al. |
| 9,988,241 B2 | 6/2018 | Lehtinen |
| 2012/0318615 A1 | 12/2012 | Aulanko et al. |
| 2014/0008153 A1 | 1/2014 | Fargo et al. |
| 2014/0291076 A1 | 10/2014 | Guilani et al. |
| 2015/0307321 A1 | 10/2015 | Breite et al. |
| 2016/0318737 A1 | 11/2016 | Joki |
| 2017/0066630 A1 | 3/2017 | Gurvich et al. |
| 2017/0217729 A1 | 8/2017 | Lehtinen |
| 2018/0009634 A1 | 1/2018 | Guilani et al. |
| 2018/0044137 A1 | 2/2018 | Pelto-Huikko et al. |
| 2018/0155870 A1 | 6/2018 | Eastman et al. |
| 2019/0315596 A1 | 10/2019 | Sera et al. |
| 2020/0039791 A1 | 2/2020 | Ma |
| 2020/0122971 A1 | 4/2020 | Hida et al. |
| 2021/0229956 A1 | 7/2021 | Dudde |

FOREIGN PATENT DOCUMENTS

| | | |
|---|---|---|
| CN | 204400392 U | 6/2015 |
| CN | 104787643 A | 7/2015 |
| CN | 105645220 A | 6/2016 |
| CN | 205636323 U | 10/2016 |
| CN | 103803383 B | 11/2016 |
| CN | 104552988 B | 5/2017 |
| EP | 1555233 A1 | 7/2005 |
| EP | 1795483 A1 | 6/2007 |
| EP | 3015413 A1 | 5/2016 |
| EP | 3336034 A1 | 6/2018 |
| EP | 3608277 A1 | 2/2020 |
| WO | 2011004071 A2 | 1/2011 |
| WO | 2011133872 A2 | 10/2011 |
| WO | 2019233574 A1 | 12/2019 |

OTHER PUBLICATIONS

European Office Action; European Application No. 19190338.4; Date: Apr. 14, 2021; 6 pages.
European Search Report Issued In EP Application No. 19190338.4, Mail Date Dec. 9, 2019, 142 Pages.
TRB TR Beltrack Co., Ltd., "Bucket Elevator Conveyor Belt", Daejeon City, Accessed Online Aug. 2, 2018, 2 Pages. URL: http://trbeltrack.com/en/home_en/menu02/sub04/sub04_1/.

BELT WITH LAYERED LOAD BEARING ELEMENTS

CROSS REFERENCE TO RELATED APPLICATIONS

This application claims the benefit of U.S. application Ser. No. 16/055,596, filed Aug. 6, 2018, the disclosure of which in incorporated herein by reference in its entirety.

BACKGROUND

Embodiments disclosed herein relate to elevator systems, and more particularly, to a load bearing member configured for use in an elevator system.

Elevator systems are useful for carrying passengers, cargo, or both, between various levels in a building. Some elevators are traction based and utilize load bearing tension members such as ropes or belts for supporting the elevator car and achieving the desired movement and positioning of the elevator car.

Where ropes are used as tension members, each individual rope is not only a traction device for transmitting the pulling forces but also participates directly in the transmission of the traction forces. Where belts are used as a tension member, a plurality of load bearing elements are embedded in a common elastomer belt body. The load bearing tension elements are exclusively responsible for transmitting the pulling forces, while the elastomer material transmits the traction forces. Due to their light weight and high strength, load bearing tension members formed from unidirectional fibers arranged in a rigid matrix composite provide significant benefits when used in elevator systems, particularly high rise systems. However, the unidirectional composite construction results in a high bending stiffness which can produce substantial bending stress when used in an elevator system where the load bearing tension member is wrapped around a traction sheave.

BRIEF DESCRIPTION

In one embodiment, a load bearing tension member for an elevator system includes a plurality of tension elements arrayed across a tension member width. The tension elements are offset from a tension member central axis, the central axis bisecting a tension member thickness and extending across the tension member width. The tension elements include a plurality of fibers extending along a length of the tension element, and a matrix material in which the plurality of fibers are embedded. A jacket at least partially encapsulates the plurality of tension elements.

Additionally or alternatively, in this or other embodiments, the plurality of tension elements are at least two tension elements arranged symmetrically about the tension member central axis, with a first tension element located at a first side of the tension member central axis and a second tension element located at a second side of the tension element.

Additionally or alternatively, in this or other embodiments the first tension member and the second tension member are separated by a separator layer of jacket material.

Additionally or alternatively, in this or other embodiments the plurality of tension elements are alternatingly staggered relative to the tension member central axis, along the tension member width.

Additionally or alternatively, in this or other embodiments the plurality of tension elements are arrayed such that a center of each tension member is positioned along a preselected arc.

Additionally or alternatively, in this or other embodiments the plurality of fibers includes one or more of carbon, glass, aramid, nylon, or polymer fibers.

Additionally or alternatively, in this or other embodiments the plurality of fibers includes steel fibers.

Additionally or alternatively, in this or other embodiments the tension elements have a rectangular or circular cross-section.

Additionally or alternatively, in this or other embodiments the jacket is formed from an elastomeric material.

Additionally or alternatively, in this or other embodiments the matrix material is a polyurethane, vinylester, or epoxy material.

In another embodiment, an elevator system includes a hoistway, an elevator car movable along the hoistway, and one or more tension members operably connected to the elevator car to move the elevator car along the hoistway. A tension member of the one or more tension members includes a plurality of tension elements arrayed across a tension member width. The tension elements are offset from a tension member central axis, the central axis bisecting a tension member thickness and extending across the tension member width. The tension elements include a plurality of fibers extending along a length of the tension element, and a matrix material in which the plurality of fibers are embedded. A jacket at least partially encapsulates the plurality of tension elements.

Additionally or alternatively, in this or other embodiments the plurality of tension elements are at least two tension elements arranged symmetrically about the tension member central axis, with a first tension element located at a first side of the tension member central axis and a second tension element located at a second side of the tension element.

Additionally or alternatively, in this or other embodiments the first tension member and the second tension member are separated by a separator layer of jacket material.

Additionally or alternatively, in this or other embodiments the plurality of tension elements are alternatingly staggered relative to the tension member central axis, along the tension member width.

Additionally or alternatively, in this or other embodiments the plurality of tension elements are arrayed such that a center of each tension member is positioned along a preselected arc.

Additionally or alternatively, in this or other embodiments the preselected arc matches a sheave crown of the elevator system.

Additionally or alternatively, in this or other embodiments the plurality of fibers includes one or more of carbon, glass, aramid, nylon, or polymer fibers.

Additionally or alternatively, in this or other embodiments the plurality of fibers includes steel fibers.

Additionally or alternatively, in this or other embodiments the tension elements have a rectangular or circular cross-section.

Additionally or alternatively, in this or other embodiments the matrix material is a polyurethane, vinylester, or epoxy material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
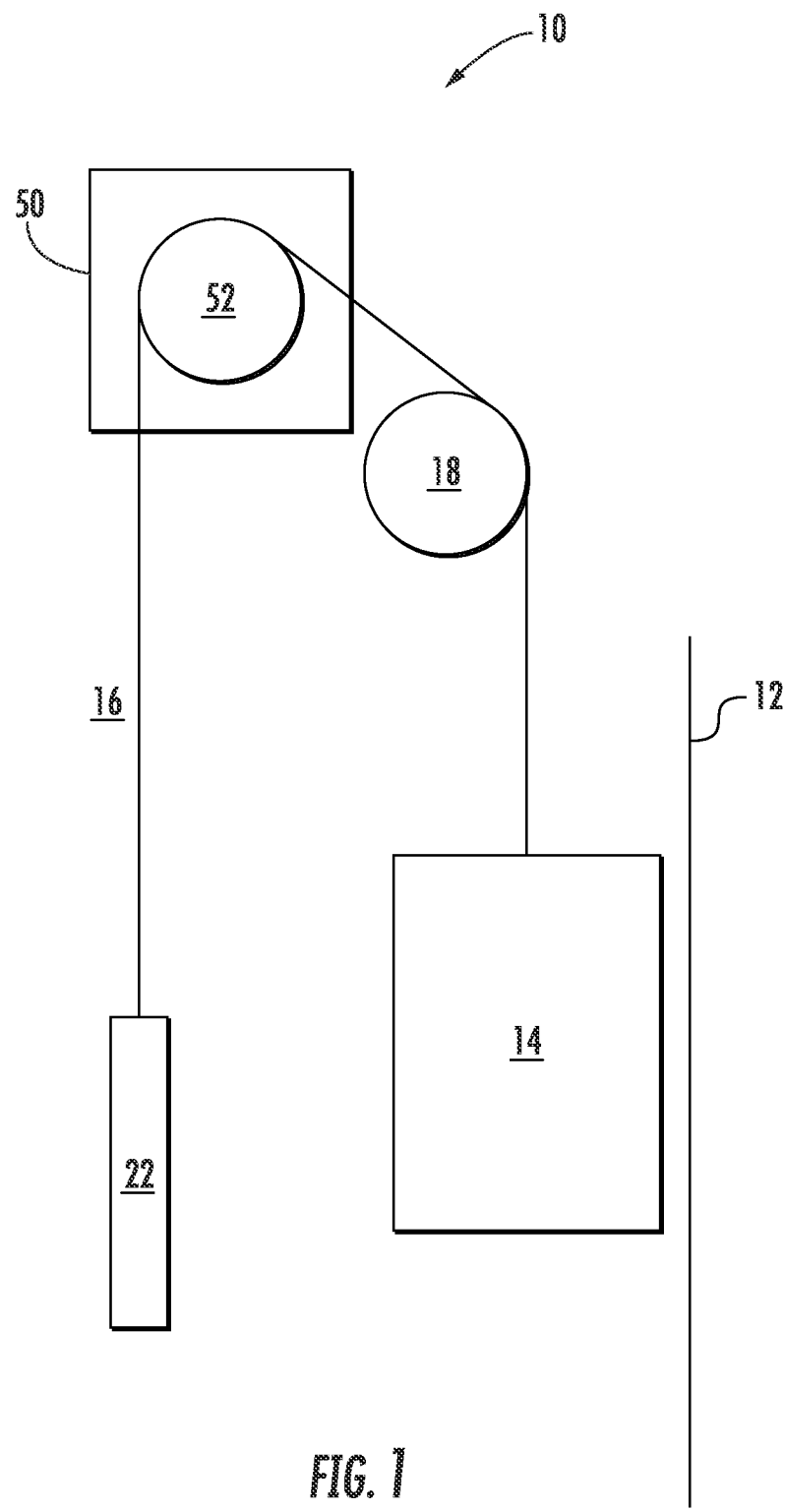
FIG. 1 is a schematic view of an embodiment of an elevator system.

Shown in FIG. 1 is a schematic view of an exemplary traction elevator system 10. Features of the elevator system 10 that are not required for an understanding of the present invention (such as the guide rails, safeties, etc.) are not discussed herein. The elevator system 10 includes an elevator car 14 operatively suspended or supported in a hoistway 12 with one or more load bearing tension members, for example belts 16. The one or more belts 16 interact with sheaves 18 and 52 to be routed around various components of the elevator system 10. Sheave 18 is configured as a diverter, deflector or idler sheave and sheave 52 is configured as a traction sheave, driven by a machine 50. Movement of the traction sheave 52 by the machine 50 drives, moves and/or propels (through traction) the one or more belts 16 that are routed around the traction sheave 52. Diverter, deflector or idler sheaves 18 are not driven by a machine 50, but help guide the one or more belts 16 around the various components of the elevator system 10. The one or more belts 16 could also be connected to a counterweight 22, which is used to help balance the elevator system 10 and reduce the difference in belt tension on both sides of the traction sheave during operation. The sheaves 18 and 52 each have a diameter, which may be the same or different from each other.

In some embodiments, the elevator system 10 could use two or more belts 16 for suspending and/or driving the elevator car 14 In addition, the elevator system 10 could have various configurations such that either both sides of the one or more belts 16 engage the sheaves 18, 52 or only one side of the one or more belts 16 engages the sheaves 18, 52. The embodiment of FIG. 1 shows a 1:1 roping arrangement in which the one or more belts 16 terminate at the car 14 and counterweight 22, while other embodiments may utilize other roping arrangements.

The belts 16 are constructed to meet belt life requirements and have smooth operation, while being sufficiently strong to be capable of meeting strength requirements for suspending and/or driving the elevator car 14 and counterweight 22.

Figure 2:
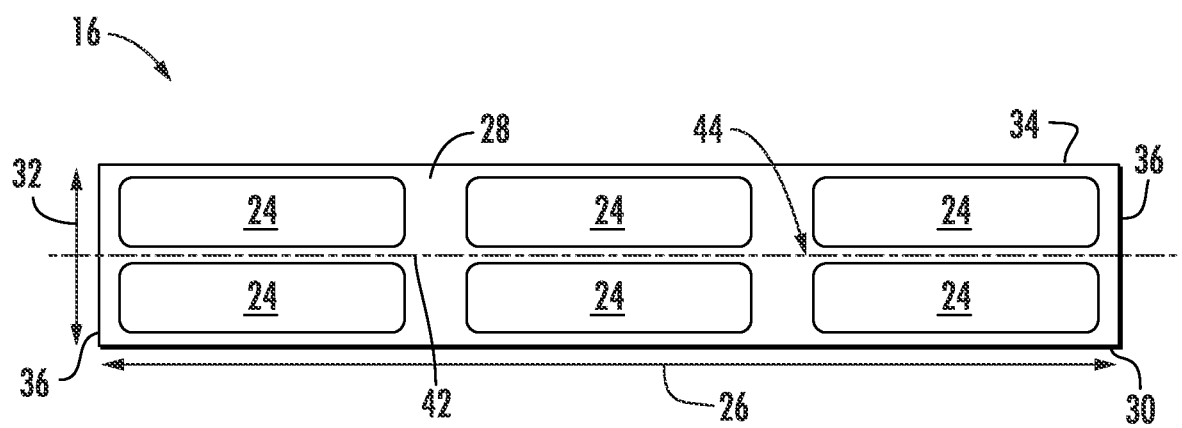
FIG. 2 is a cross-sectional view of an embodiment of a load bearing tension member of an elevator system.

FIG. 2 provides a cross-sectional schematic of an exemplary belt 16 construction or design. The belt 16 includes a plurality of tension elements 24 extending longitudinally along the belt 16 and arranged across a belt width 26. The tension elements 24 are at least partially enclosed in a polymeric jacket 28 to restrain movement of the tension elements 24 in the belt 16 with respect to each other and to protect the tension elements 24. The jacket 28 defines a traction side 30 configured to interact with a corresponding surface of the traction sheave 52. A primary function of the jacket 28 is to provide a sufficient friction between the belt 16 and the traction sheave 52 to produce a desired amount of traction therebetween. The jacket 28 should also transmit the traction loads to the tension elements 24. In addition, the jacket 28 should be wear resistant and protect the tension elements 24 from impact damage, exposure to environmental factors, such as chemicals, for example. Exemplary materials for the jacket 28 include the elastomers of thermoplastic and thermosetting polyurethanes, polyaramid, and rubber, for example. Other materials may be used to form the jacket 28 if they are adequate to meet the required functions of the belt 16.

The belt 16 has a belt width 26 and a side belt thickness 32, with an aspect ratio of belt width 26 to belt thickness 32 greater than one. The belt 16 further includes a back side 34 opposite the traction side 30 and belt edges 36 extending between the traction side 30 and the back side 34. While sides 32 and 36 are illustrated as flat surfaces, other shapes of sides 32 and 36, for example, fully or partially convex or concave, may be used in other embodiments. While six tension elements 24 are illustrated in the embodiment of FIG. 2, other embodiments may include other numbers of tension elements 24, for example, 4, 10 or 12 tension elements 24. Further, while the tension elements 24 of the embodiment of FIG. 2 are substantially identical, in other embodiments, the tension elements 24 may differ from one another.

Figure 3:
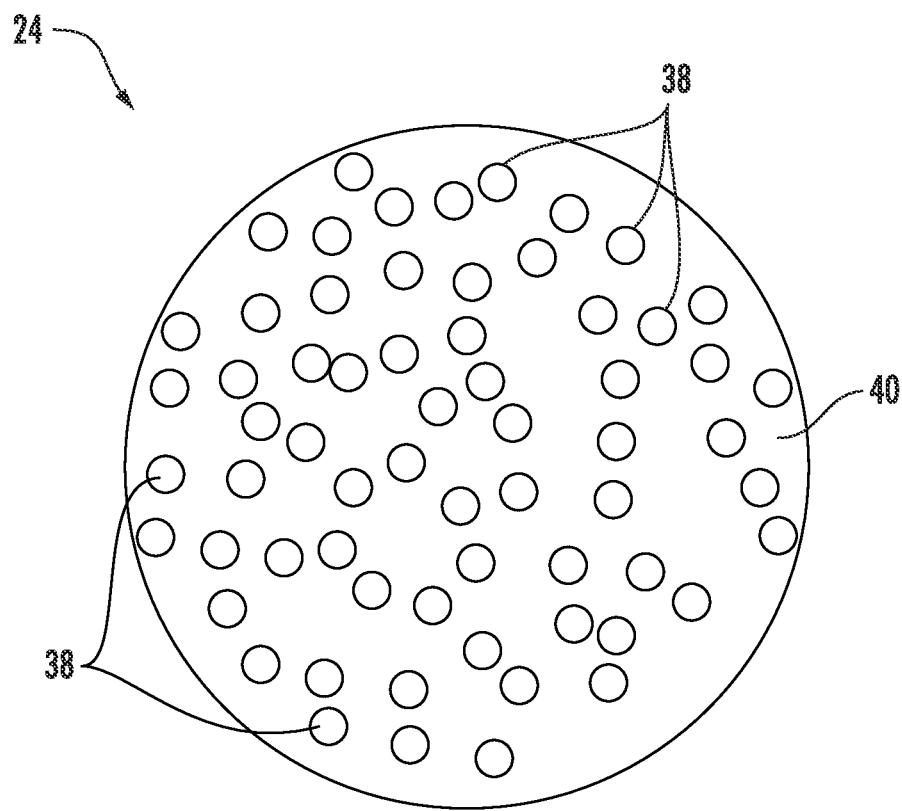
FIG. 3 is a cross-sectional view of an embodiment of a tension element for a tension member of an elevator system.

An exemplary tension element 24 is illustrated in FIG. 3. The tension element 24 includes a plurality of load bearing fibers 38 suspended in a matrix material 40. Exemplary load bearing fibers 38 used to form a tension element 24 include, but are not limited to, carbon, glass, aramid, nylon, and polymer fibers for example. Each of the fibers 38 within a single tension element 24 may be substantially identical or may vary. In addition, the matrix material 40 may be formed from any suitable material, such as polyurethane, vinylester, and epoxy for example. The materials of the fibers 38 and matrix material 40 are selected to achieve a desired stiffness and strength of the belt 16.

In some embodiments, the tension elements 24 are formed as thin layers, in some embodiments by a pultrusion process. In a standard pultrusion process, the fibers 38 are impregnated with the matrix material 40 and are pulled through a heated die and additional curing heaters where the matrix material 40 undergoes cross linking. A person having ordinary skill in the art will understand that controlled movement and support of the pulled fibers may be used to form a desired linear or curved profile of the untensioned belt 16. It is to be appreciated that in some embodiments, other fibers 38 such as steel fibers may be embedded in the matrix material 40.

Referring again to FIG. 2, the tension elements 24 are arranged to reduce bending resistance of the belt 16, to allow for use of smaller sheave 18, 52 diameters, thereby reducing space occupied by the elevator system 10. The belt 16 has a central belt axis 42 extending across the belt width 26 and bisecting the belt thickness 32. Tension elements 24 are arranged, not at the central belt axis 42, but symmetrically about the central belt axis 42 with equal numbers of tension elements 24 on each side of the central belt axis 42. The tension elements 24 are separated by a separator layer 44 of, for example, jacket 28 material.

Figure 4:
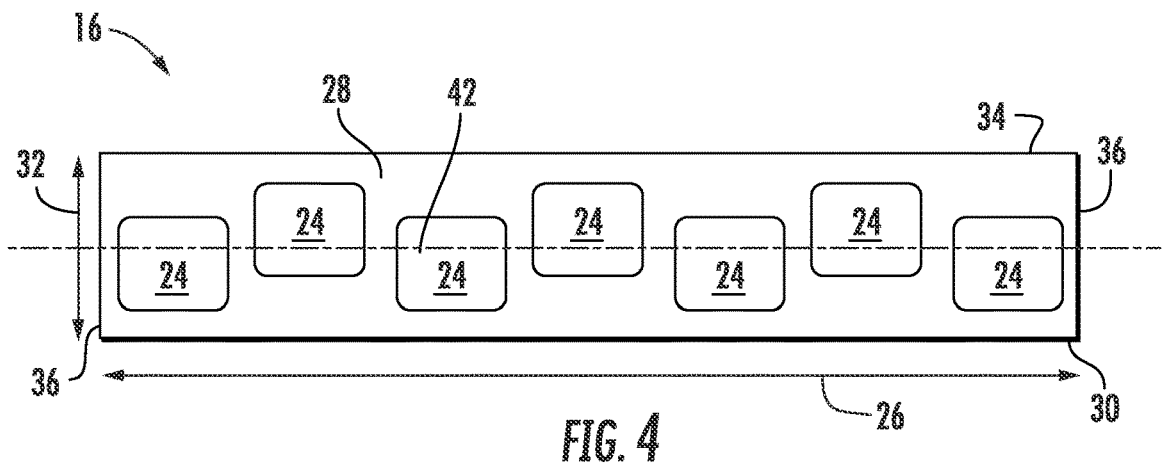
FIG. 4 is a cross-sectional view of another embodiment of a load bearing tension member of an elevator system.
Figure 5:
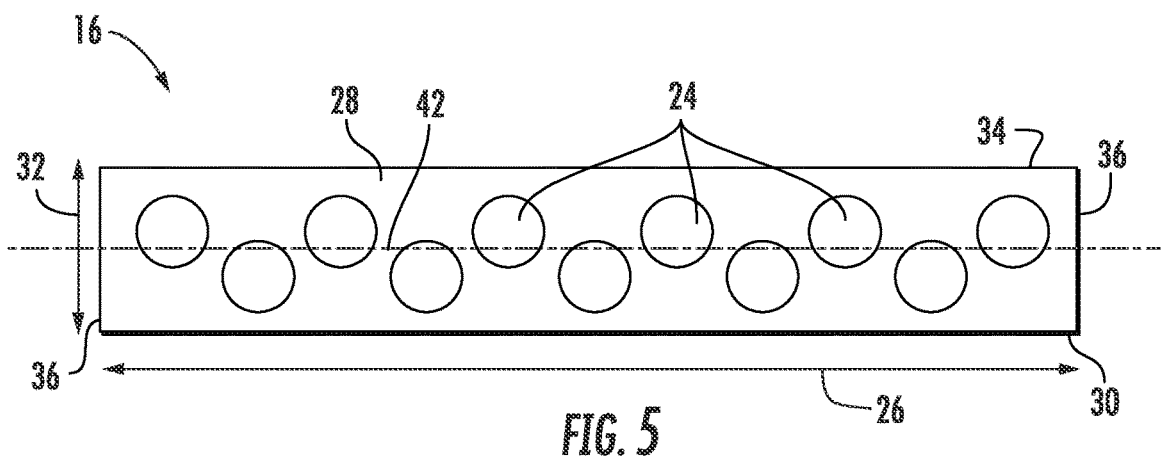
FIG. 5 is a cross-sectional view of yet another embodiment of a load bearing tension member of an elevator system.

Referring now to FIG. 4, in some embodiments, the tension elements 24 are alternatingly staggered about the central belt axis 42, with alternating tension elements 24 located mostly, or entirely, at a first side 46 of the central belt axis 42 and at a second side 48 of the central belt axis 42. Further, referring now to FIG. 5, the tension elements 24 may take other shapes, such as circular as shown, or oval or other shapes.

Figure 6:
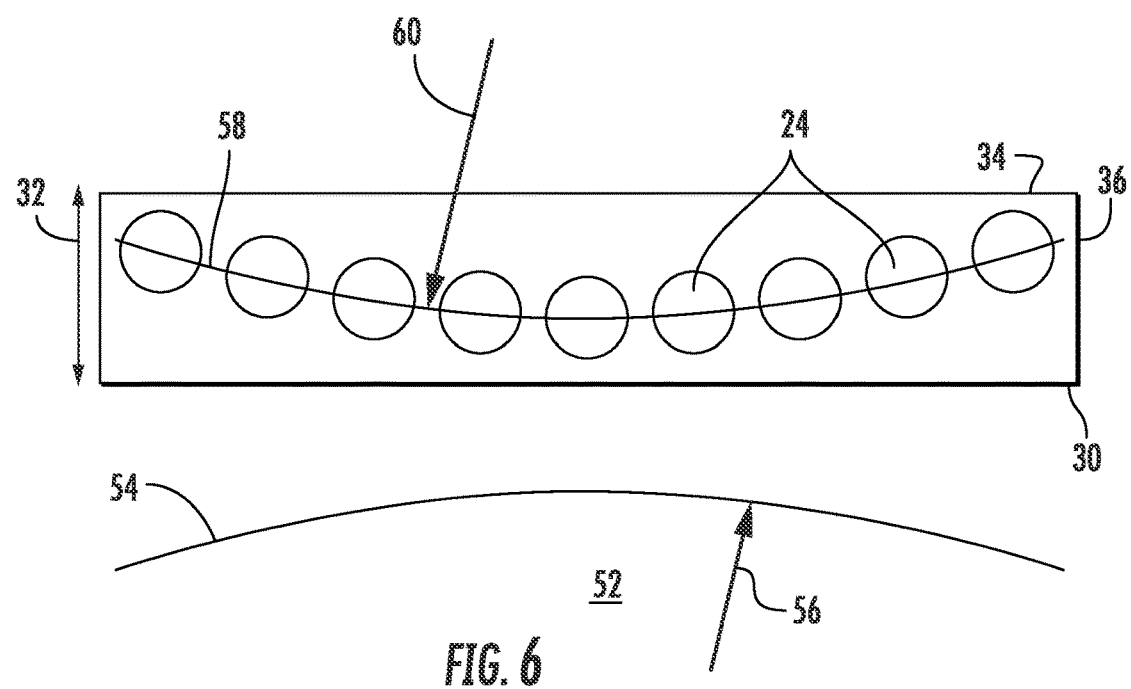
FIG. 6 is a cross-sectional view of still another embodiment of a load bearing tension member of an elevator system.

Another embodiment is illustrated in FIG. 6. In this embodiment, the traction sheave 52 has a crowned sheave surface 54. In some embodiments the crown is a constant crown radius 56. In the belt 16, the tension elements 24 are arrayed across the belt 16 in a pattern defined by a tension element curve 58. Each tension element center of the tension elements 24 is located along the tension element curve 58. In the embodiment shown the tension element curve 58 is defined by a tension element radius 60, which is equal to the crown radius 56, but inverted relative to the crown radius 56. This arrangement has the technical effect of equalizing loads on the tension elements 24 regardless of their position along the belt width 26.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A load bearing tension member for an elevator system, comprising:
   a plurality of tension elements arrayed across a tension member width, the tension elements offset from a tension member central axis bisecting a tension member thickness and extending across the tension member width, the tension elements including:
      a plurality of fibers extending along a length of the tension element; and
      a matrix material in which the plurality of fibers are embedded; and
   a jacket at least partially encapsulating the plurality of tension elements;
   wherein the plurality of tension elements are arranged in a single layer across the tension member thickness and a center of each tension element is positioned along a preselected arc.

2. The tension member of claim 1, wherein the plurality of fibers includes one or more of carbon, glass, aramid, nylon, or polymer fibers.

3. The tension member of claim 1, wherein the plurality of fibers includes steel fibers.

4. The tension member of claim 1, wherein the tension elements have a rectangular of circular cross-section.

5. The tension member of claim 1, wherein the jacket is formed from an elastomeric material.

6. The tension member of claim 1, wherein the matrix material is a polyurethane, vinylester, or epoxy material.

7. An elevator system, comprising:
   a hoistway;
   an elevator car movable along the hoistway; and
   one or more tension members operably connected to the elevator car to move the elevator car along the hoistway, a tension member of the one or more tension members including:
      a plurality of tension elements arrayed across a tension member width, the tension elements offset from a tension member central axis bisecting a tension member thickness and extending across the tension member width, the tension elements including:
         a plurality of fibers extending along a length of the tension element; and
         a matrix material in which the plurality of fibers are embedded; and
      a jacket at least partially encapsulating the plurality of tension elements;
      wherein the plurality of tension elements are arranged in a single layer across the tension member thickness and a center of each tension element is positioned along a preselected arc.

8. The elevator system of claim 7, wherein the preselected arc matches a sheave crown of the elevator system.

9. The elevator system of claim 7, wherein the plurality of fibers includes one or more of carbon, glass, aramid, nylon, or polymer fibers.

10. The elevator system of claim 7, wherein the plurality of fibers includes steel fibers.

11. The elevator system of claim 7, wherein the tension elements have a rectangular of circular cross-section.

12. The elevator system of claim 7, wherein the matrix material is a polyurethane, vinylester, or epoxy material.

\* \* \* \* \*